April 26, 1927.
H. O. SHORT
1,626,483
MEANS FOR ELASTICALLY CONNECTING LANDING GEAR TO AIRCRAFT
Filed Jan. 3, 1927   3 Sheets-Sheet 3
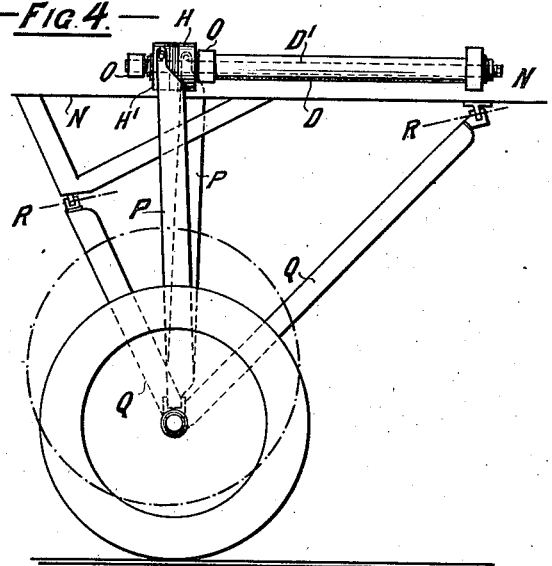
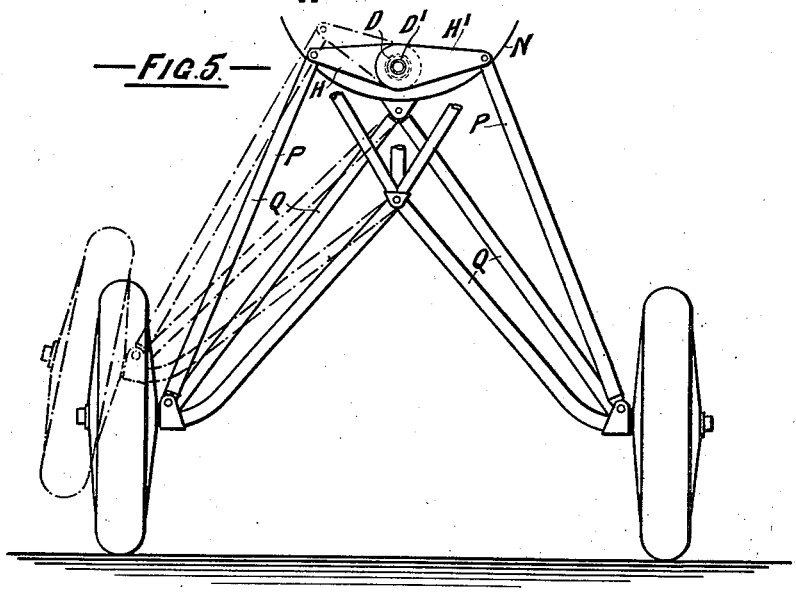

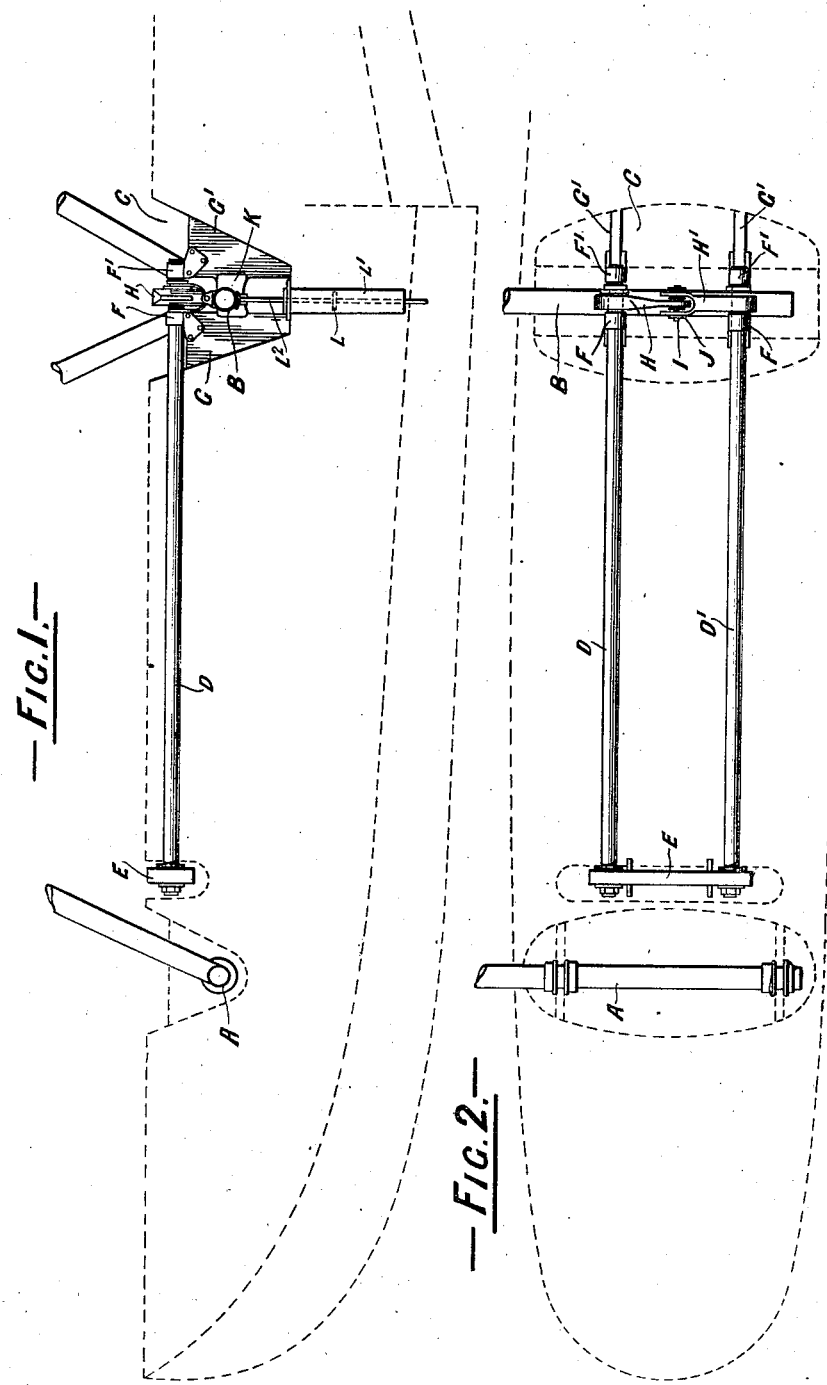

Patented Apr. 26, 1927.

1,626,483

UNITED STATES PATENT OFFICE.

HUGH OSWALD SHORT, OF ROCHESTER, ENGLAND.

MEANS FOR ELASTICALLY CONNECTING LANDING GEAR TO AIRCRAFT.

Application filed January 3, 1927, Serial No. 158,671, and in Great Britain March 29, 1926.

This invention relates to means for elastically connecting landing gear to aircraft, such for instance as the elastic connection of floats to the under frames of aircraft, or elastically connecting the wheels or wheeled carriages thereto.

Broadly the invention consists in elastically restraining the movements between the wheels, floats, or other landing gear, and the frame of the machine, by means of torsion members carrying crank arms. These torsion members are connected to one part of the aircraft, either the landing gear or the main body of the aircraft, in such a manner that the said torsion members are held in position and prevented from rotation at points distant from the crank arms, and the outer ends of such crank arms are attached to the other part of the aircraft. As the landing chassis or floats rise and fall, the torsion members are twisted and resiliently resist relative movement between the main portion of the aircraft and its landing gear.

A simple form of application of the invention consists in the under frame of the aircraft carrying one or two cross tubes, gripped firmly to the frame and having ends projecting laterally therefrom. Arms connected to the free ends of such cross tubes are connected to floats or to the wheel carriage, in such a way that the wheels or the floats may rise and fall, twisting the cross tubes as they rise and fall, with increasing resistance as the twisting is amplified. The elastic restraining of the movements of the wheels or floats may be supplemented by oleo struts, dash pots or other elastic buffers between the wheels or floats and the under frame of the machine.

Figure 7:
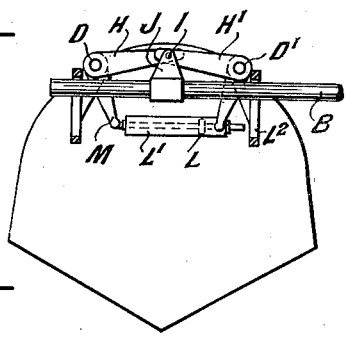
Figure 8:
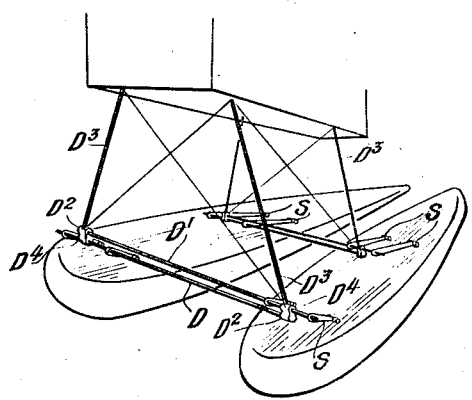

Examples of the application of this invention will now be described with reference to the accompanying drawings, in which Fig. 1 is a sectional elevation, Fig. 2 a plan view, and Fig. 3 a transverse sectional view showing the attachment of floats to the under carriage of an aircraft, one float only being shown. Figs. 4, 5 and 6 are respectively a side elevation, front elevation, and a plan view showing the invention applied to a wheel landing gear for aircraft. Figs. 7 and 8 show further examples of the means for attaching floats to aircraft.

Figure 3:
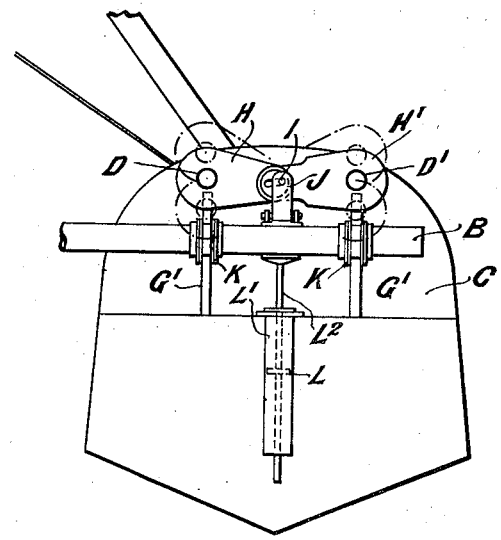

Referring to Figs. 1, 2 and 3, the under carriage struts support forward and rear cross tubes A, B in the usual way, and the forward cross tube may be received in bearings carried by the float, which permit the leading portion of the float to pivot about the said forward cross tube A, whilst the rear portion of the float rises and falls relatively to the rear cross tube. A transverse gap or slot C is formed in the upper portion of the float, to permit of the float rising and falling, whilst the rear cross tube B is contained within the gap.

Torsion tubes D, D¹ extend longitudinally of the float and are rigidly connected at their forward ends to a bar E which is anchored to the float, and their rearward ends pass freely through bearings F, F¹ fixed to webs G, G¹ in the gap C of the float.

Upon the torsion tubes D, D¹ adjacent to their rear ends are fixed lever arms H, H¹, the free ends of which engage with a pivot pin I which also passes through an upstanding yoke or bracket J carried by the rear cross tube B. Upon the rear cross tube is fixed a guide K which slides upon the webs G, G¹, in such a manner that as the float rises or falls relatively to the rear cross tube, the bracket J, carried by the rear cross tube, which engages with the pivot I passing through the free ends of the arms H, H¹, is depressed or elevated, thus turning both arms downwards or upwards and twisting both torsion tubes D, D¹ inwards or outwards as though they were in gear together.

The twisting of the torsion tubes elastically resists the upward or downward movement of the float, such resistance increasing in degree as the tubes are twisted, and the bar E receiving the twisting stress which is opposite in direction, the structure is relieved of the duty of receiving such stresses.

In order to prevent bouncing, the movements of the float may be restrained by a dash pot arrangement, which, as shown at Figs. 1 and 3, may consist of a piston L carried in a cylinder L¹ which is fixed to the float, while the piston rod L² is connected to the rear cross tube B, or the dash pot attachment may be arranged as shown at Fig. 7, carried by arms M, M fixed on the torsion tubes D D¹, the cylinder, which is arranged horizontally, being carried by one of the arms M, and the piston rod being attached to the other arm.

The torsion tubes may be arranged outside above the float, or they may be contained within the float, and their ends with the arms H, H¹ may be exposed in the gap C in the float and the free ends of the arms may engage with suitable fittings on the rear cross tube and not obstruct the stream-line in any way.

Instead of anchoring the torsion tubes to the float or to the forward cross tube, they may be anchored to the rear cross tube and the arms be connected to the float. The float may also be elastically connected by a system of torsion tube attachments as previously described, both at the forward cross tube and at the rear cross tube, and the torsion tubes may extend forward or aft from either or both the forward and rear cross tubes. They may also be in any number and of any suitable length.

Referring to Figs. 4, 5 and 6, two torsion tubes D and D¹ are shown, arranged concentrically one within the other and the said tubes are together at their rear ends where they may be anchored to the fuselage N of the aircraft. The forward ends of the tubes D and D¹ pass independently through bearings O carried on the fuselage. At the forward ends of the tubes D and D¹ are fixed crank arms H, H¹ extending outwardly in opposite directions and having their outer ends pivotally connected to struts P, the lower ends of which are connected to the lower portions of frames Q carrying the wheel axles. Each wheel of the carriage is carried by a frame Q which is hinged upon an inclined axis R. Upon the landing carriage receiving shocks, the frames Q will move upon their inclined axes R in the manner indicated by dotted lines at one side of Fig. 5, which movement raises the struts P and rocks the arms H, H¹ in opposite directions, giving torsional stresses to the tubes D, D¹.

At Fig. 8 an arrangement is shown where the torsion tubes D, D¹ are placed transversely and extend over two floats placed side by side. Each tube D and D¹ is fixed at D² to the under frame D³, which also carries bearings D⁴ through which the tubes pass freely. Pairs of lever arms S are fixed to the tubes D, D¹ and extend at right angles thereto, their outer ends being pivotally connected to the floats. In this example four torsion tubes D and D¹ are shown, two carried by the forward members of the under frame D³ and two carried by the rearward members of the said frame.

Although torsion tubes have been referred to, the torsion members may be of any section, but tubing is the preferable form for securing the maximum torsion effect for the minimum of weight of the metal in the twisting member.

What I claim as my invention and desire to secure by Letters Patent is:—

1. In apparatus for elastically connecting landing gear to aircraft, in which the lower portion or landing gear moves relatively to the upper portion or main structure of the aircraft; elastic connections comprising torsion members such as metal tubes, means for fixing and preventing from rotation one part of the said torsion members, bearings on one portion of the aircraft for holding the torsion members on the said portion, cranks on the torsion members located adjacent to such bearings, and pivoted connections between the free ends of said cranks and the other portion of the aircraft.

2. In apparatus for elastically connecting landing gear to aircraft, in which the lower portion or landing gear moves relatively to the upper portion or main structure of the aircraft; elastic connections comprising torsion members such as metal tubes, means for fixing and preventing from rotation one end of the said torsion members, bearings on one portion of the aircraft for holding the torsion members on the said portion, cranks on the torsion members located adjacent to such bearings, and pivoted connections between the free ends of said cranks and the other portion of the aircraft.

3. In apparatus for elastically connecting landing gear to aircraft, in which the lower portion or landing gear moves relatively to the upper portion or main structure of the aircraft; elastic connections comprising torsion members such as metal tubes, means for rigidly connecting one part of a torsion member to a similar part of another torsion member, bearings on one portion of the aircraft for holding the torsion members on the said portion and located at a distance from the rigid connection of said torsion members, cranks on the torsion members located adjacent to said bearings, and pivoted connections between the free ends of said cranks and the other portion of the aircraft.

4. In apparatus for elastically connecting landing gear to aircraft, in which the lower portion or landing gear moves relatively to the upper portion or main structure of the aircraft; elastic connections comprising torsion members such as metal tubes, means for rigidly connecting one part of a torsion member to a similar part of another torsion member, bearings on one portion of the aircraft for holding the torsion members on the said portion and located at a distance from said rigid connections, cranks on the torsion members located adjacent to said bearings, the cranks on one torsion member being oppositely directed in relation to the crank on the other torsion member, and pivoted connections between the free ends of said cranks and the other portion of the aircraft.

5. In apparatus for elastically connecting landing gear to aircraft, in which the lower portion or landing gear moves relatively to the upper portion or main structure of the aircraft; elastic connections comprising two tubes arranged side by side, rigid connections between the end of one tube with the end of the other tube, bearings on one portion of the aircraft for holding the tubes, cranks on the tubes adjacent to the bearings, and pivotal connections between the free ends of the cranks and the other portion of the aircraft.

6. In apparatus for elastically connecting landing gear to aircraft, in which the lower portion or landing gear moves relatively to the upper portion or main structure of the aircraft; elastic connections comprising two tubes arranged side by side, rigid connections between the end of one tube with the end of the other tube, bearings on one portion of the aircraft for holding the tubes, a crank on one tube projecting in one direction, a crank on the other tube projecting in the opposite direction, and pivotal connections between the free ends of the cranks and the other portion of the aircraft.

7. In apparatus for elastically connecting landing gear to aircraft, in which the lower portion or landing gear moves relatively to the upper portion or main structure of the aircraft; elastic connections comprising two concentric tubes, the inner tube being longer than the outer tube and projecting therefrom, a rigid connection between such tubes, a bearing on one portion of the aircraft located distant from such rigid connection, a crank on the free end of the large tube projecting in one direction, a crank on the end of the small tube projecting in the opposite direction, and pivotal connections between the other portion of the aircraft and the free ends of the cranks.

In witness whereof I have hereunto set my hand.

HUGH OSWALD SHORT.